US012587571B2

(12) United States Patent
Miller et al.

(10) Patent No.: US 12,587,571 B2
(45) Date of Patent: Mar. 24, 2026

(54) ENTERPRISE AGNOSTIC FRAMEWORK FOR PERFORMING ENTERPRISE FUNCTIONS

(71) Applicant: T-Mobile Innovations LLC, Overland Park, KS (US)

(72) Inventors: Loren J. Miller, Snohomish, WA (US); Vaishali Patil, Sammamish, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 244 days.

(21) Appl. No.: 18/467,222

(22) Filed: Sep. 14, 2023

(65) Prior Publication Data

US 2025/0097267 A1 Mar. 20, 2025

(51) Int. Cl.
*H04L 9/40* (2022.01)

(52) U.S. Cl.
CPC .............. *H04L 63/20* (2013.01); *H04L 63/08* (2013.01)

(58) Field of Classification Search
CPC ................................. H04L 63/08; H04L 63/20
See application file for complete search history.

(56) References Cited

U.S. PATENT DOCUMENTS

| | | | |
|---|---|---|---|
| 2007/0156689 A1* | 7/2007 | Meek ...................... | G06F 9/541 |
| 2020/0057631 A1* | 2/2020 | Taniguchi ................. | G06F 8/20 |
| 2020/0097162 A1* | 3/2020 | Hayashi .............. | G06F 3/04847 |
| 2023/0214193 A1* | 7/2023 | Makhija ........... | G06V 30/19113 |
| | | | 717/105 |
| 2023/0231802 A1* | 7/2023 | Vysotsky ............ | H04L 12/4633 |
| | | | 709/224 |

* cited by examiner

*Primary Examiner* — Gil H. Lee

(57) ABSTRACT

A method comprises storing a plurality of rules by which a rules engine is configured to determine an application to perform an enterprise function for the enterprise related service, wherein the application is a shared application, determining, based on a first rule stored in the data store, the shared application to perform a first enterprise function, wherein the first rule indicates that first enterprise function is capable of being performed by the shared application that is shared across a plurality of different enterprise servers, determining, by the rules engine in the communications system, based on a second rule stored in the data store, the shared application to perform a second enterprise function, where the second rule indicates that second enterprise function is also capable of being performed by the shared application that is shared across the different enterprise servers.

20 Claims, 5 Drawing Sheets

100

106

Request Handler App 122

Rules Engine 125

Shared Applications 128

Enterprise-Specific Application 131

112A

112B

112N

Network
107

115

Rules
142

Enterprise Server
103

Client App
118

3P Partner Server 109

3P Partner App 145

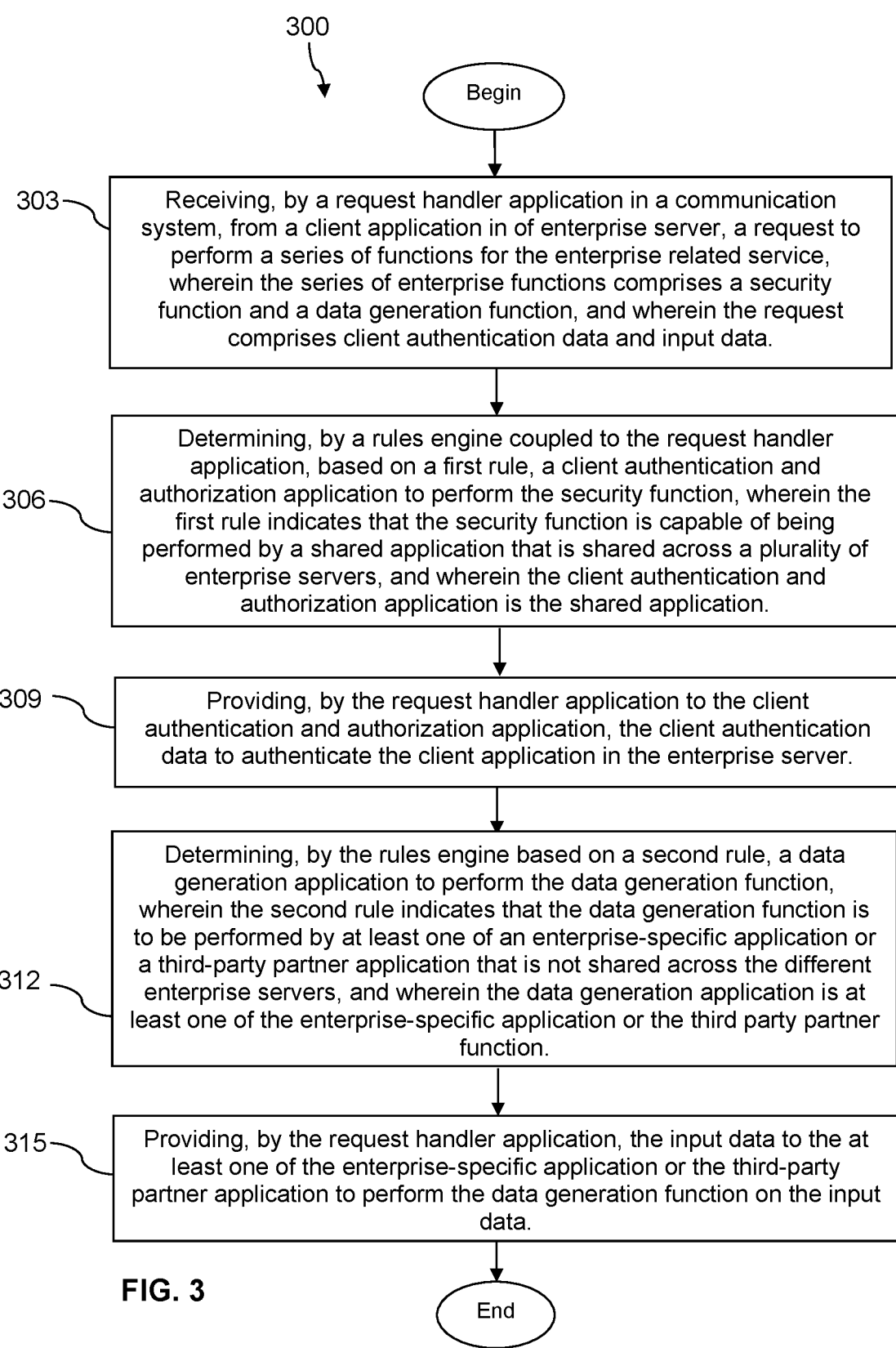

300

Begin

303 — Receiving, by a request handler application in a communication system, from a client application in of enterprise server, a request to perform a series of functions for the enterprise related service, wherein the series of enterprise functions comprises a security function and a data generation function, and wherein the request comprises client authentication data and input data.

306 — Determining, by a rules engine coupled to the request handler application, based on a first rule, a client authentication and authorization application to perform the security function, wherein the first rule indicates that the security function is capable of being performed by a shared application that is shared across a plurality of enterprise servers, and wherein the client authentication and authorization application is the shared application.

309 — Providing, by the request handler application to the client authentication and authorization application, the client authentication data to authenticate the client application in the enterprise server.

312 — Determining, by the rules engine based on a second rule, a data generation application to perform the data generation function, wherein the second rule indicates that the data generation function is to be performed by at least one of an enterprise-specific application or a third-party partner application that is not shared across the different enterprise servers, and wherein the data generation application is at least one of the enterprise-specific application or the third party partner function.

315 — Providing, by the request handler application, the input data to the at least one of the enterprise-specific application or the third-party partner application to perform the data generation function on the input data.

End

FIG. 3

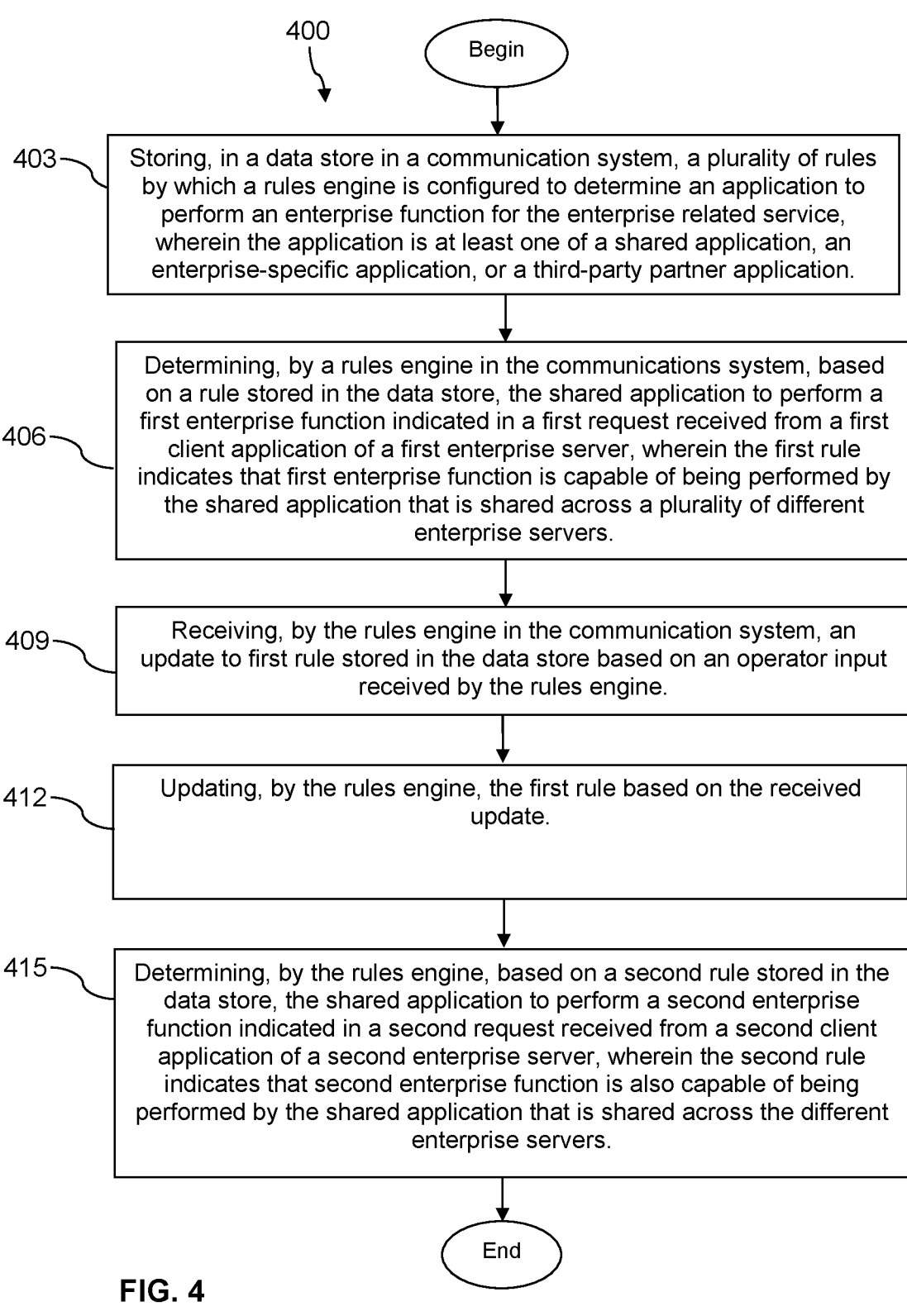

400

Begin

403 — Storing, in a data store in a communication system, a plurality of rules by which a rules engine is configured to determine an application to perform an enterprise function for the enterprise related service, wherein the application is at least one of a shared application, an enterprise-specific application, or a third-party partner application.

406 — Determining, by a rules engine in the communications system, based on a rule stored in the data store, the shared application to perform a first enterprise function indicated in a first request received from a first client application of a first enterprise server, wherein the first rule indicates that first enterprise function is capable of being performed by the shared application that is shared across a plurality of different enterprise servers.

409 — Receiving, by the rules engine in the communication system, an update to first rule stored in the data store based on an operator input received by the rules engine.

412 — Updating, by the rules engine, the first rule based on the received update.

415 — Determining, by the rules engine, based on a second rule stored in the data store, the shared application to perform a second enterprise function indicated in a second request received from a second client application of a second enterprise server, wherein the second rule indicates that second enterprise function is also capable of being performed by the shared application that is shared across the different enterprise servers.

End

FIG. 4

ENTERPRISE AGNOSTIC FRAMEWORK FOR PERFORMING ENTERPRISE FUNCTIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A business enterprise may include multiple sectors or sub-divisions, each of which in theory may operate independently of one another. An organizational silo may refer to a business sub-division that does not share information with other business sub-divisions. When a business enterprise operates using sub-division silos, the sharing and communication of information is scarce. Such a manner of operating a business enterprise may be counter-productive to business goals, because the restrictions on the sharing of information often leads to redundancies and unnecessary processing requirements to protect data leakage between silos. Thus, there are several disadvantages to a single business enterprise operating in a manner in which sub-divisions do not share resources and information when possible.

SUMMARY

In an embodiment, a method for implementing a workflow for performing an enterprise related service is disclosed. The method comprises receiving, by a request handler application in a communication system, from a client application of an enterprise server, a request to perform a series of functions for the enterprise related service, in which the series of functions comprises a security function and a data generation function, and the request comprises client authentication data and input data. The method further comprises determining, by a rules engine coupled to the request handler application, based on a first rule, a client authentication and authorization application to perform the security function, in which the first rule indicates that the security function is capable of being performed by a shared application that is shared across a plurality of different enterprise servers, and the client authentication and authorization application is the shared application. The method further comprises providing, by the request handler application to the client authentication and authorization application, the client authentication data to authenticate the client application in the enterprise server, determining, by the rules engine based on a second rule, a data generation application to perform the data generation function, in which the second rule indicates that the data generation function is to be performed by at least one of an enterprise-specific application or a third-party partner application that is not shared across the different enterprise servers, and the data generation application is at least one of the enterprise-specific application or the third-party partner application.

The method further comprises providing, by the request handler application, the input data to the at least one of the enterprise-specific application or the third-party partner application to perform the data generation function on the input data.

In another embodiment, a communication system is disclosed. The communication system comprises a processor, a non-transitory memory, a request handler application, and a rules engine. The request handler application is stored in the non-transitory memory, which when executed by the processor, causes the processor to be configured to receive, from a client application in an enterprise server, a request to perform a series of functions for an enterprise related service. The rules engine is stored in the non-transitory memory, which when executed by the processor, causes the processor to be configured to identify, based on a first rule, whether a first function in the series of functions is capable of being performed by a shared application that is shared across a plurality of different enterprise client applications, in which the first rule indicates that the first function is capable of being performed by the shared application based on at least one of data describing the client application, data describing the enterprise server, data describing the enterprise related service, or the first function, and identify, based on a second rule, whether a second function in the series of functions is to be performed by at least one of an enterprise-specific application or a third-party partner application, both of which are not shared across the different enterprise client applications, in which the second rule indicates that the second function is to be performed by the at least one of the enterprise-specific application or the third-party partner application based on at least one of the data describing the client application, the data describing the enterprise server, the data describing the enterprise related service, or the second function. The request handler application is further configured to instruct the shared application to perform the first function and instruct the at least one of the enterprise-specific application or the third-party partner application to perform the second function.

In yet another embodiment, a method for implementing an enterprise agnostic workflow for performing an enterprise related service is disclosed. The method comprises storing, in a data store in a communication system, a plurality of rules by which a rules engine is configured to determine an application to perform an enterprise function for the enterprise related service, in which the application is at least one of a shared application, an enterprise-specific application, or a third-party partner application. The method further comprises determining, by a rules engine in the communications system, based on a first rule stored in the data store, the shared application to perform a first enterprise function indicated in a first request received from a first client application of a first enterprise server, in which the first rule indicates that first enterprise function is capable of being performed by the shared application that is shared across a plurality of different enterprise servers. The method further comprises receiving, by the rules engine in the communication system, an update to the first rule stored in the data store based on an operator input received by the rules engine, updating, by the rules engine, the first rule based on the update, and determining, by the rules engine in the communications system, based on a second rule stored in the data store, the shared application to perform a second enterprise function indicated in a second request received from a second client application of a second enterprise server, in which the second rule indicates that second enterprise function is also capable of being performed by the shared application that is shared across the different enterprise servers.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3 is a flow chart of a method according to various embodiments of the disclosure.

FIG. 4 is a flow chart of another method according to various embodiments of the disclosure.

DETAILED DESCRIPTION

Figure 1:
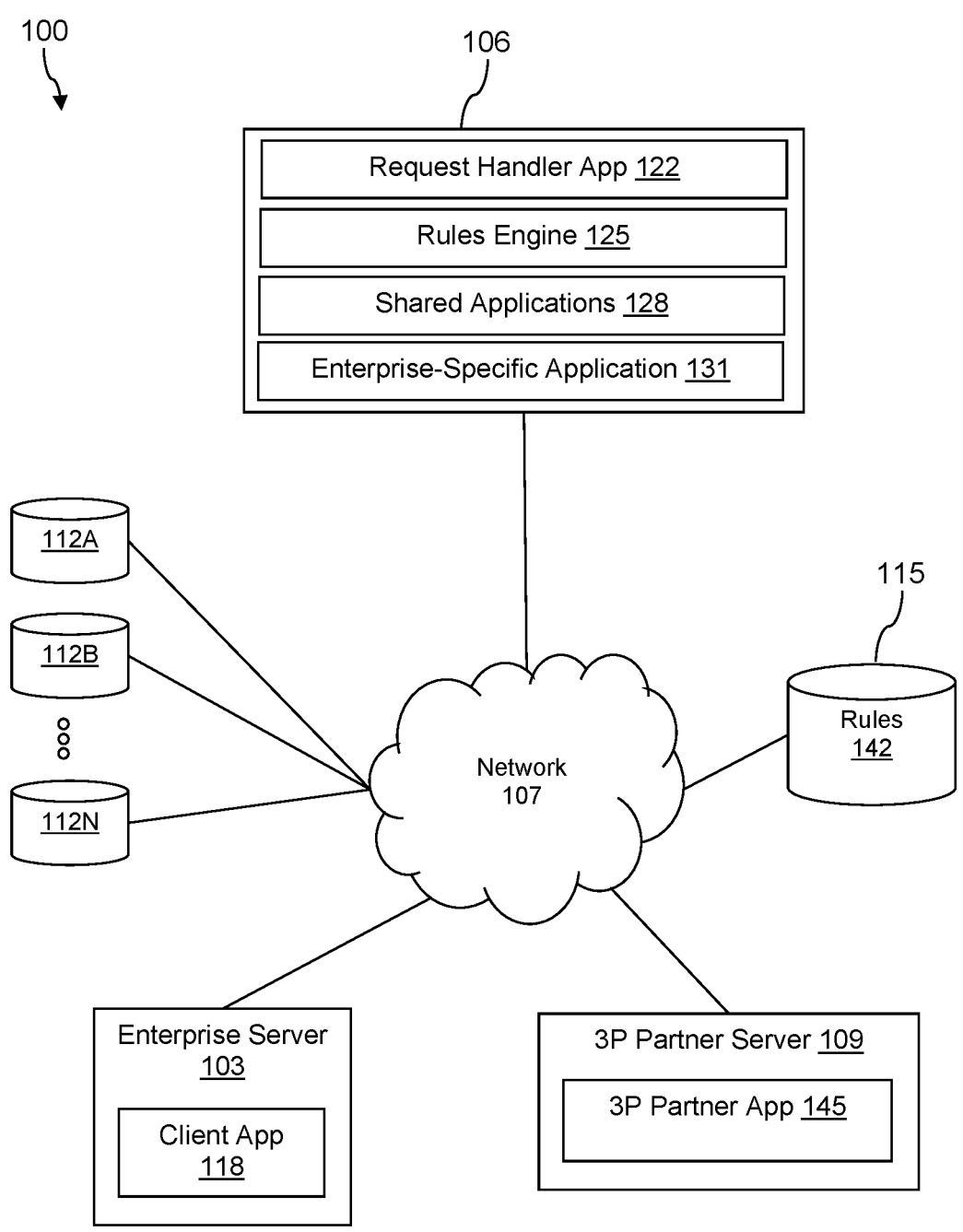
FIG. 1 is a block diagram of a system according to various embodiments of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Business enterprises may include many different subsections or divisions, which may each provide various enterprise related services, in which each enterprise related service may include a series of one or more enterprise functions, or software tasks, that may be performed to provide the service. To this end, a business enterprise communication system may implement a large number of different enterprise functions that are siloed or implemented using a commercially available third party (3P) partner software/hardware solution, making these business functions difficult to maintain. For example, most enterprise related services may be implemented using similar enterprise functions (sometimes also referred to herein as "business functions"), such as an authentication function, data validation function, data storage function, logging function, etc. In some cases, each of these functions may be stored separately in association with each of the different business enterprises, in the form of logic or code created by a software specialist that has tested and debugged the function before deployment.

In this way, a single enterprise may store and maintain multiple different enterprise functions, that largely perform the same function, but may be used for performing different enterprise related services. This by itself is largely wasteful from a storage and processing perspective, since these enterprise functions are hard-coded logic that sometimes consume a considerable amount of memory. When the same hard-coded logic is produced and stored redundantly throughout the system, valuable processing and storage capacity may be wasted.

In some cases, some of these commonly used enterprise functions may be minimally customized for a particular enterprise need, even though such a customization may be unnecessary and costly to implement. More specifically, the customization of these commonly used enterprise functions may incur a heavy implementation and maintenance cost and has a long implementation time, among many other disadvantages. Moreover, the customized hard-coded nature of these enterprise functions may prevent the function from being easily upgraded or maintained in a periodic manner, given the high implementation and resource cost, plus the need for an experienced software technician to revise the hard-coded logic for the function. For example, when an update is performed on a hard-coded software solution, a programmer may have to manually update the software, rebuild the software, test the software, deploy the software, etc. Therefore, the updating process is largely inefficient and task intensive. The replacement of these enterprise functions may also cost double the initial effort of generating the customized enterprise function.

In addition, different enterprise related services may maintain similar enterprise functions separately, for example, across one or more memories in a communication system. When a business enterprise intends to upgrade all of the software functions (e.g., thousands) at the enterprise, for example, to implement a more robust and secure authentication scheme, the enterprise may have to upgrade all of the enterprise functions separately, even though many of the enterprise functions may be similar and thus, redundant. The separate updating of these thousands of separate but similar enterprise functions may consume an unnecessarily large amount of processing and networking resources. In this way, the storage and maintenance of commonly used enterprise functions in a separate and redundant fashion is largely inefficient from a networking, processing, and storage resource perspective.

The present disclosure teaches a technical solution to the foregoing technical problem related to application management and execution in a communication system by sharing applications between different sub-divisions within the same business enterprise. In some cases, the shared applications may be stored at a system and accessed by the different sub-divisions in a sub-division agnostic manner. As used herein, a sub-division agnostic manner may refer to a manner in which the shared application operates without knowledge or regard to the specific sub-division for which the enterprise function is performed. For example, the shared application may perform an enterprise function for multiple different sub-divisions, without receiving any sub-division specific data for the enterprise function, and thus without knowledge or regard to the sub-division while performing the enterprise function.

A general architecture of the communication system may include one or more enterprise servers, each of which be associated with a different sub-division of a business enterprise, and each of which may include one or more client applications used to request an enterprise related service or an enterprise function. As mentioned above, the enterprise related service may be a series of enterprise functions, some of which may be common functions or applications performed for many different types of enterprise related services, some of which may be enterprise-specific applications or applications that may be performed with specific enterprise-related data, and some of which may be performed by a 3P partner application located on an external 3P partner server. One or more of these enterprise functions may be performed using data stored across one or more data stores or systems in the communication system.

The embodiments disclosed herein may introduce a request handler application and a rules engine into the aforementioned architecture, both of which communicate with one another to perform the enterprise functions requested by a client application. A rule data store may also be introduced in the communication system to store rules, which may be used by the rules engine to perform various tasks. For example, the rules engine may use a rule to determine whether an enterprise function is capable of being performed by a shared application or is to be performed by an enterprise-specific application or a 3P partner application. In an embodiment, the rules engine may use a rule to determine whether to provide additional data associated with an enterprise, an enterprise server, or an enterprise related service to the enterprise function. Each rule may be stored in a record with one or more of an identifier of an associated enterprise, enterprise related service, enterprise function(s), input data, output data, validation methods, associated databases, 3P partner invocation requirements, publishing data, logging data, and/or any data that may be relevant to an enterprise function. Each record may also include, for example, data-driven logic or instructions for a particular application.

In an embodiment, the request handler application may receive a request to perform an enterprise related service or an enterprise function from a client application, for example, via one or more application programming interfaces (APIs). The request handler application may access a rule to determine whether an enterprise function is capable of being performed by a shared application or is to be performed by an enterprise-specific application or a 3P partner application. In an embodiment, a rule may indicate whether a function is capable of being performed by the shared application or is to be performed by the enterprise-specific application or the 3P partner application based on at least one of data describing the client application, data describing the enterprise server, data describing the enterprise related service, or the first function.

In an embodiment, the system may maintain one or more shared functions or shared applications, which may include data-driven logic or instructions corresponding to the common functions that may be used for multiple different types of enterprise related services. For example, the shared applications may include a client authentication and authorization application, a data validation application, a data orchestrator application, a data storage application, a data publishing application, a data logging application, and/or any other type of application or function that may be commonly invoked by multiple different enterprise servers to perform an enterprise related function.

For example, two different enterprise servers may correspond to two different enterprise subdivisions, such as, a billing sub-division and a loan sub-division. These two different enterprise servers may include different client applications that request different types of enterprise related services. The client application at the billing sub-division may request the system to perform a billing related service, while the client application at the loan sub-division may request the system to perform a loan application related service. The requested services are different, but certain functions performed for the services may be similar and thus may be performed by the same shared application. For example, a client authentication and authorization may be performed on the client applications in similar manner. For example, data validation may be performed on the data received from the client applications in a similar manner, to help ensure that the format of the data is either formatted according to standard business practice or formatted according to enterprise-specific standards (e.g., validating that a billing account may be a ten-digit number, a social security number may be a nine-digit number, etc.). These functions that are generally capable of being performed by the shared application may be stored in a server or data store of the communication system as instructions that may be used by client applications from many different enterprise servers. The request handler may access the shared application and input data to the shared application to perform an enterprise function and receive output data. The input data may be received from one or more data stores in the communication system, which may be associated with different sectors or sub-divisions of the enterprise. The input data may also be received directly from the client application or received from another data store external to the communication system. The input data may also be received from another application, either another shared application, enterprise-specific application, or 3P partner application.

In an embodiment, the system may also maintain one or more enterprise-specific applications, which may include hard-coded logic or instructions for an enterprise function that may be dependent on specific enterprise-related input data. The enterprise-specific application may not be shareable with other enterprise servers, but may instead only be invoked by the corresponding enterprise server for which the enterprise-specific application is hard-coded. In an embodiment, the enterprise-specific applications may be stored at a data store that is specifically dedicated to a particular sub-division or enterprise server. Alternatively, the enterprise-specific applications may be stored at a general data store that is not specifically dedicated to a sub-division or enterprise server. In an embodiment, the enterprise-related input data may be data associated with the enterprise related service or the enterprise, the input data may be received from the client application in a request, or the input data may be received from another application. The enterprise-related input data may be indicated in a rule corresponding to the function, which may signal to the request handler application that the function is to be performed by an enterprise-specific application as opposed to a shared application.

In an embodiment, a 3P partner application may be maintained by a 3P partner server, which may not be accessible by the request handler application or the enterprise server requesting the enterprise function. To this end, the request handler may use a rule to determine that a particular enterprise function is to be performed by the 3P partner application, and determine the data that may be used by the 3P partner application. The request handler may transmit the data to the 3P partner server, and wait to receive a response from the 3P partner server.

In this way, the communication system maintains data that may be used as input to various applications across one or more data stores or memories in the system. A rule in the rule data store may indicate how the data from the data stores may be used by an application to perform an enterprise function. The request handler application and the rules engine may access rules to obtain the data for the enterprise functions and pass the data with corresponding instructions to a shared application, an enterprise-specific application, or a 3P partner application.

In some embodiments, the rules engine may create new rules or update rules to implement various customizations of a shared application, and the rules engine may use the rules to determine whether to use a shared application, enterprise-specific application, or a 3P partner application. For example, an operator of the system may provide an input to the system, which may be received by the rules engine to either update an existing rule, create a new rule, delete an existing rule, or somehow modify an existing rule. The rules engine may perform the corresponding updating, creating, deleting, or modifying process on the rule according to the input received from the operator based on the data-driven logic that may be stored in the rule. In other words, since the rule itself is not hard-coded, the data-driven logic of the rule may be far easier to modify and update since such a modification or update may simply involve the addition or modification of data/instructions stored with the rule.

In this way, the embodiments disclosed herein provide shared applications as reusable software services. The shared applications are scalable and stateless (e.g., pass information between applications without needing to maintain the state of data), in contrast to the enterprise-specific applications. The shared applications may be more highly available and extensible when compared to the enterprise-specific applications. The shared applications may be used by multiple different enterprise servers for different enterprise related services. Therefore, the embodiments disclosed herein increase network and storage capacity by reducing network and storage resource usage in the communication system.

Turning now to FIG. 1, a communication system 100 is described. In an embodiment, the communication system 100 comprises an enterprise server 103, an application server 106, a 3P partner server 109, data stores 112A-N, a rules data store 115, and a network 107. It should be appreciated that the communication system 100 may include other devices, applications, servers, and/or data stores not explicitly shown in FIG. 1. In an embodiment, communication system 100 may be associated with a particular enterprise, such as, for example, a telecommunications mobile network operating company.

The network 107 comprises one or more public networks, one or more private networks, or a combination thereof. While FIG. 1 shows the enterprise server 103, application server 106, 3P partner server 109, data stores 112A-N, and/or rule data store 115 as being separate from the network 107, in some embodiments, the enterprise server 103, application server 106, 3P partner server 109, data stores 112A-N, and/or rule data store 115 may be part of the network 107. In an embodiment, the enterprise server 103, application server 106, 3P partner server 109, data stores 112A-N, and rule data store 115 may communicate via the network 107 in accordance with data protocols such as, for example, Transmission Control Protocol (TCP)/Internet Protocol (IP).

The enterprise server 103 may include multiple processors, memories, and networking resources, which may be used to perform the tasks of the applications included therewith. The system 100 may include multiple enterprise servers 103 and each may correspond to, for example, a different sector or sub-division within an enterprise. Each enterprise server 103 may include, for example, a client application 118 and one or more APIs, which may be used to request an enterprise related service or enterprise function from the application server 106. The client application 118 may generate the request and the request may include, for example, an identifier of the enterprise server 103 or the enterprise sub-division associated with the enterprise server 103. The request may also include additional data regarding the enterprise related service or the enterprise function being requested. The client application 118 may transmit the request to the application server 106 via, for example, one or more API calls.

The application server 106 may also include multiple processors, memories, and networking resources, which may be used to perform the tasks of the applications included therewith. The application server 106 may include a request handler application 122, rules engine 125, and one or more APIs. The request handler application 122 may manage the general steps of the enterprise related service or enterprise functions requested by the client application 118. The request handler application 122 may receive the request from the client application 118 via, for example, one or more API calls.

The application server 106 may also store one or more shared applications 128. The shared applications 128 may include data-driven logic or instructions corresponding to common functions that may be used by multiple different enterprise sub-divisions to perform tasks for different enterprise related services. In other words, many different client applications 118 across many different enterprise servers 103 may use the same shared applications 128 to perform an enterprise function on behalf of the enterprise related service. For example, the shared applications 128 may include a client authentication and authorization application, a data validation application, a data orchestration application, a data storage application, a data publishing application, a data logging application, and/or any other type of application or function that may be commonly invoked by multiple different enterprise servers 103 to perform an enterprise related service or an enterprise function.

The application server 106 may also store one or more enterprise-specific applications 131. The enterprise-specific applications 131 may include hard-coded logic or instructions for an enterprise function that may be dependent on specific enterprise-related input data, which may also be related to the output data from a prior enterprise function in the series of enterprise functions. The enterprise-specific application 131 may not be shareable with other enterprise servers 103, but may instead only be invoked by the corresponding enterprise server 103 for which the enterprise-specific application 131 is hard-coded. For example, if an enterprise-specific application 131 is maintained for an enterprise server 103 associated with a billing system, the enterprise-specific application 131 may not be invoked (i.e., performed) on behalf of any other sub-division or enterprise server 103 other than the enterprise server 103 associated with the billing system. This may be because the enterprise-specific application 131 is specifically coded to be dependent on specific enterprise-related input data, which may not be accessible to other sub-divisions or enterprise servers 103 other than the enterprise server 103 associated with the billing system.

The rule data store 115 may include rules 142, which may be used by the rules engine 125. The rules 142 may each be embodied as a record, storing one or more of an identifier of an associated enterprise, enterprise related service, enterprise function, input data, output data, validation methods, associated databases, 3P partner invocation requirements, publishing data, logging data, and/or any data that may be relevant to an enterprise function. Each record may also include, for example, data-driven logic or instructions for a particular application. The record may include data-driven logic used to make various determinations regarding where an enterprise function should be routed (e.g., to a shared application 128, an enterprise-specific application 131, or a 3P partner application 145) and the input data used for the enterprise function (e.g., data from a data store 112A-N or output data from an application).

The rules engine 125 may make determinations by executing the different rules 142 that are selected based on the specific enterprise function being performed, in which the enterprise function may be performed using a shared application 128, an enterprise-specific application 131, or a 3P partner application 145. The rules engine 125 may use a rule 142 to determine whether an enterprise function is capable of being performed by a shared application 128 or is to be performed by an enterprise-specific application 131 or a 3P partner application 145. In an embodiment, the rules engine 125 may use a rule 142 to determine whether to provide additional data associated with an enterprise, an enterprise server, or an enterprise related service to an application.

The rules engine 125 may also receive operator input, which may be used to modify, add, or delete rules 142 from the rules data store 115. In an embodiment, modifying or updating the rules 142 may include modifying or updating the data-driven logic stored at the rule 142 since the rules 142 store data and data-driven logic used to make various determinations regarding where an enterprise function should be routed and the input data used for the application.

The 3P partner server 109 may also include multiple processors, memories, and networking resources, which may be used to perform the tasks of the applications included therewith. The request handler application 122 may forward data related to an enterprise function to a 3P partner application 145 via, for example, one or more API calls. The data may be forwarded in response to the rules engine 125 determining that the 3P partner application 145 is to be used to perform the enterprise function. The 3P partner application 145 may be encoded as instructions or even data-driven logic, which may be performed by the external 3P partner server 109 as a method of offloading the tasks related to this enterprise function to save resources at the enterprise.

The data stores 112A-N may, in one embodiment, each be related to different enterprise sub-divisions, which may each also correspond to different enterprise servers 103. For example, data store 112A may include data associated with a billing system, data store 112B may include data associated with a payment processing system, data store 112N may include data associated with a credit eligibility system, etc. Alternatively, the data stores 112A-N may be sub-division agnostic, and may instead, for example, respectively store similar categories of data (e.g., account data, product data, payment data, etc.).

The data in the data stores 112A-N may be used, for example, as input to the enterprise functions implemented by the shared applications 128, the enterprise-specific applications 131, and/or the 3P partner applications 145. In an embodiment, the rules engine 125 may determine the data from the data stores 112A-N that may be used for an enterprise function. The request handler application 122 may have access to the data in the data stores 112A-N, and may obtain access to the data used for an enterprise function being instructed by the request handler application 122.

Figure 2:
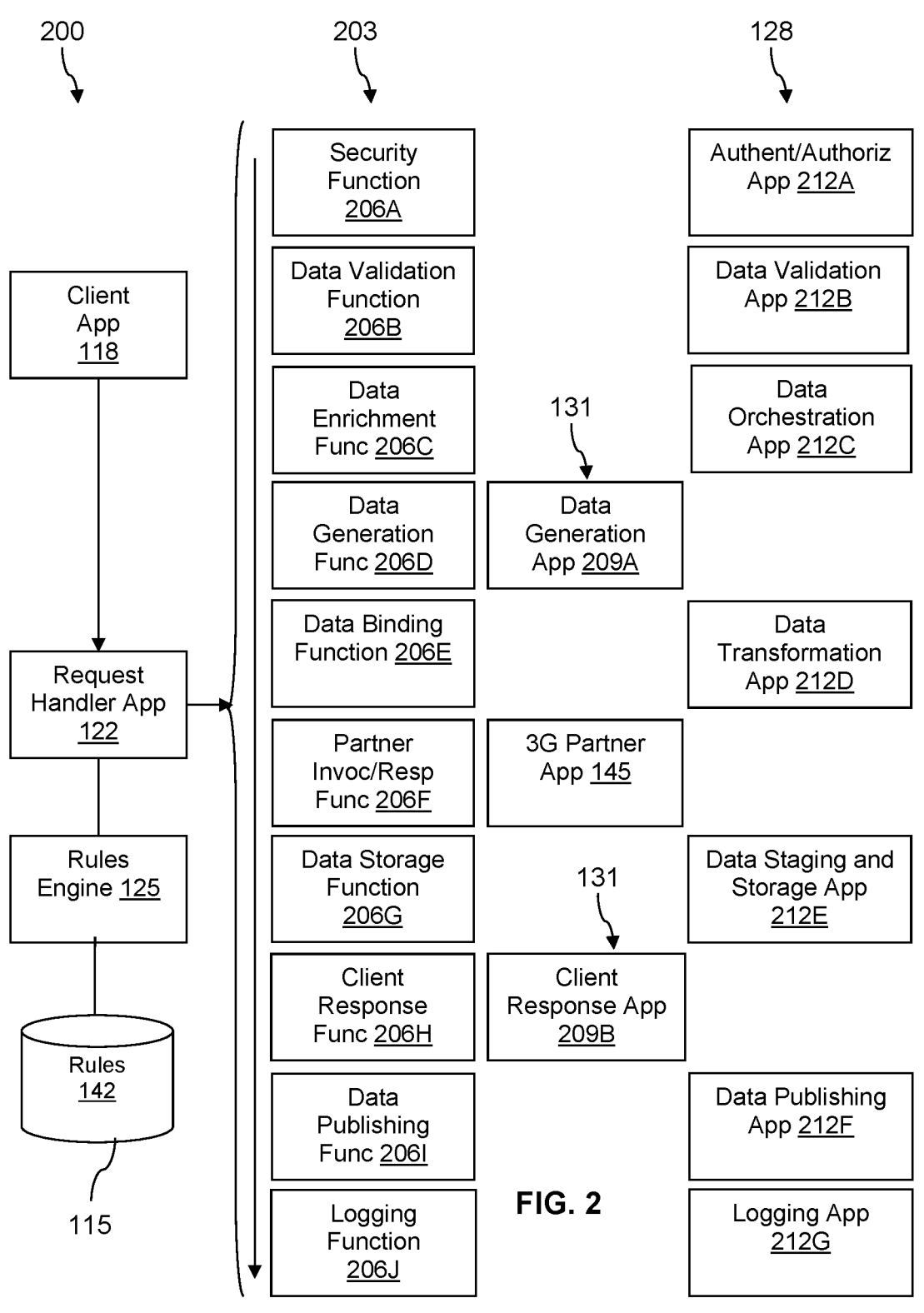
FIG. 2 is an illustration of a partially enterprise agnostic workflow for performing an enterprise related service according to various embodiments of the disclosure.

Referring now to FIG. 2, a partially enterprise agnostic workflow 200 for performing an enterprise related service is disclosed. The workflow 200 may begin with a client application 118 at an enterprise server 103 sending a request to the request handler application 122 at the application server 106. The request may be for performing an enterprise function or an enterprise related service, including a series of enterprise functions 203. The request may include an identifier of the enterprise server 103 or the enterprise sub-division associated with the enterprise server 103. The request may also include additional data regarding the enterprise related service or the enterprise function requested. The client application 118 may transmit the request to the request handler application 122 via, for example, one or more API calls.

The request handler application 122 may then determine how to manage the requested enterprise function or enterprise related service. In an embodiment, the request handler application 122 may communicate with the rules engine 125 to make various determinations regarding the management of the requested enterprise function or enterprise related service.

In the example shown in FIG. 2, the request may be for performing an enterprise related service, which may include a series of enterprise functions 203, some of which may be performed by shared applications 128, some of which may be performed by enterprise-specific applications 131, and some of which may be performed by 3P partner applications 145. The request handler application 122 may obtain the enterprise related service from the request, and determine the series of enterprise functions 203 for performing the enterprise related service. The request handler application 122 may determine a sequence of the series of enterprise functions 203 based on, for example, a rule 142 included in the rule data store 115, indicating that enterprise related services requested from a specific enterprise server 103 includes the series of enterprise functions 203 shown in FIG. 2.

As shown in FIG. 2, the series of enterprise functions 203 determined based on the request received from the client application 118 includes a security function 206A, a data validation function 206B, a data enrichment function 206C, a data generation function 206D, a data binding function 206E, a partner invocation and response function 206F, a data storage function 206G, a client response function 206H, a data publishing function 206I, and a logging function 206J. As should be appreciated, a workflow 200 may include other types of functions 206A-J and any number of functions 206A-J, which may differ from the specific example shown in FIG. 2.

For each of these functions 206A-J in FIG. 2, the request handler application 122 may access a rule 142 in the rule data store 115 to determine whether the particular function 206A-J is capable of being performed by a shared application 128 or is to be performed by an enterprise-specific application 131 or a 3P partner application 145. The rules engine 125 may also access the rule 142 to make this determination and forward the determination to the request handler application 122, such that the request handler application 122 may be responsible for routing instructions to perform the function 206A-J to the determined type of application 128, 131, or 145. For example, rule 142 used to make this determination may indicate that, for a function 206A-J performed as part of the enterprise related service requested by the enterprise server 103, the function 205A-J may be capable of being performed by the shared application 128 or may need to be performed by an enterprise-specific application 131 or a 3P partner application 145.

As shown in FIG. 2, the series of enterprise functions 203 may begin with a security function 206A for authenticating and authorizing the client application 118. The request handler application 122 (or the rules engine 125) may determine that the security function 206A may be performed by a shared application 128, namely an authentication and authorization application 212A, based on a rule 142. For example, the request received from the client application

118 may have included authentication and authentication identifiers, keys, tokens, etc., that the request handler application 122 may provide to the authentication and authorization application 212A to verify the client application 118 with the request handler application 122. The request handler application 122 may provide the data received in the request to the authentication and authorization application 212A as input, and wait to receive the output/result (e.g., confirmation of success or failure) of the authentication and authorization of the client application 118 from the authentication and authorization application 212A before moving to the next enterprise function 206B. Since the authentication and authorization application 212A is a shared application 128, the request handler application 122 may route data from multiple different enterprise servers 103 and corresponding client applications 118 to the authentication and authorization application 212A, regardless of the enterprise related function being performed.

The next enterprise function in the series of enterprise functions 203 may be a data validation function 206B, which may be used to preliminarily validate the data received from the client application 118 (e.g., validate the format as being industry standard or enterprise standard, etc.). The request handler application 122 (or the rules engine 125) may determine that the data validation function 206B may be performed by a shared application 128, namely a data validation application 212B, based on a rule 142. For example, the request received from the client application 118 may have included certain data that may be used as input to one or more of the enterprise functions in the series of enterprise functions 203. The request handler application 122 may provide the data received in the request to the data validation application 212B as input, and wait to receive the output/result (e.g., validated or not) of the data validation application 212B before moving to the next enterprise function 206C. Since the data validation application 212B is a shared application 128, the request handler application 122 may route data from multiple different enterprise servers 103 and corresponding client applications 118 to the data validation application 212B, regardless of the enterprise related function being performed.

The next enterprise function in the series of enterprise functions 203 may be a data enrichment function 206C, which may be used to gather the data from, for example, data stores 112A-N to perform one or more of the enterprise functions 203. The request handler application 122 (or the rules engine 125) may determine that the data enrichment function 206C may be performed by a shared application 128, namely a data orchestration application 212C, based on a rule 142. For example, the request received from the client application 118 may have included certain data that may be used to determine how and where to gather the data from (e.g., the data stores 112A-N) to properly execute the enterprise functions and the enterprise related service. The request handler application 122 may provide the data received in the request to the data orchestration application 212C as input, such that the data orchestration application 212C runs and accesses the data stores 112A-N to gather the data requested. The request handler application 122 may then wait to receive the output/result (e.g., gathered data) of the data orchestration application 212C before moving to the next enterprise function 206D. Since the data orchestration application 212C is a shared application 128, the request handler application 122 may route data from multiple different enterprise servers 103 and corresponding client applications 118 to the data orchestration application 212C, regardless of the enterprise related function being performed.

The next enterprise function in the series of enterprise functions 203 may be a data generation function 206D, which may be used to generate data for a particular enterprise or enterprise server 103. Therefore, request handler application 122 (or the rules engine 125) may determine that the data generation function 206D may be performed by an enterprise-specific application 131, namely a data generation application 209A, based on a rule 142. A rule 142 may indicate that a data generation function 206D for a request from the enterprise server 103 is to be performed by the data generation application 209A. For example, the request received from the client application 118 may be for an enterprise related service related to a payment processing request, which may have included certain payment or authorization data (e.g., pay in full or pay a predetermined amount). Alternatively, the request received from the client application 118 may be for an enterprise related service related to a loan origination request, which may have included data regarding monthly payment charges and interest. The request handler application 122 may provide the data received in the request to the data generation application 209, such that the data generation application 209A is run based on this data in the request (i.e., the specific enterprise-related input data). The request handler application 122 may then wait to receive the output/result (e.g., data generated in response to this request) of the data generation application 209A before moving to the next enterprise function 206E. Since the data generation application 209A is an enterprise-specific application 131, the data generation application 209A may only be used for requests originating from the enterprise server 103 (i.e., the enterprise-specific application 131 is not shareable or reusable for requests received from different enterprise servers 103).

The next enterprise function in the series of enterprise functions 203 may be a data binding function 206E, which may be used to transform the data received from the data validation application 212B, data orchestration application 212C, and data generation application 209A into a particular format or normalization based on, for example, the enterprise sub-division associated with the client application 118. The request handler application 122 (or the rules engine 125) may determine that the data binding function 206E may be performed by a shared application 128, namely a data transformation application 212D, based on a rule 142. For example, the rules engine 125 may use a rule 142 to obtain, for example, enterprise related data that may be used for the data transformation application 212D to perform the transformation and normalization. The request handler application 122 may provide the enterprise related data to the data transformation application 212D as input, and wait to receive the output/result (e.g., transformed data) of the data transformation application 212D before moving to the next enterprise function 206F. Since the data transformation application 212D is a shared application 128, the request handler application 122 may route data from multiple different enterprise servers 103 and corresponding client applications 118 to the data transformation application 212D, regardless of the enterprise related function being performed.

The next enterprise function in the series of enterprise functions 203 may be a partner invocation and response function 206, which may be used to invoke the 3P partner server 109 connection to transmit the transformed data (obtained from the data transformation application 212D) to the 3P partner server 109. Therefore, the request handler application 122 (or the rules engine 125) may determine that the partner invocation and response function 206F may be performed by a 3P partner application 145 at the 3P partner server 109, based on a rule 142. The request handler application 122 may provide the transformed data to the 3P partner application 145, such that the 3P partner application 145 is run based on the transformed data. The request handler application 122 may then wait to receive the output/result (e.g., output of the 3P partner application 145) before moving to the next enterprise function 209E. The 3P partner application 145 may only be run at the 3P partner server 109, such that the 3P partner application 145 may not be shareable or reusable across different types of requests, unless explicitly indicated in, for example, a rule 142.

The next enterprise function in the series of enterprise functions 203 may be a data storage function 206G, which may be used to store data, for example, at one or more of the data stores 112A-N. The request handler application 122 (or the rules engine 125) may determine that the data storage function 206G may be performed by a shared application 128, namely a data staging and storage application 212E, based on a rule 142. The request handler application 122 may provide the output data from the 3P partner application 145 to the data staging and storage application 212E as input, and wait to receive the output/result (e.g., response regarding staging and storage of the data) of the data staging and storage application 212E before moving to the next enterprise function 206H. Since the data staging and storage application 212E is a shared application 128, the request handler application 122 may route data from multiple different enterprise servers 103 and corresponding client applications 118 to the data staging and storage application 212E, regardless of the enterprise related function being performed.

The next enterprise function in the series of enterprise functions 203 may be a client response function 206H. The request handler application 122 (or the rules engine 125) may determine that the client response function 206H may be performed by an enterprise-specific application 131, namely a client response application 209B based on a rule 142. The request handler application 122 may provide the data received from the data staging and storage application 212E to the client response application 209B. The request handler application 122 may then wait to receive the output/result (e.g., response from the client) of the client response application 209B before moving to the next enterprise function 206I. Since the client response application 209B is an enterprise-specific application 131, the client response application 209B may only be used for requests originating from the enterprise server 103 (i.e., the enterprise-specific application 131 is not shareable or reusable for requests received from different enterprise servers 103).

The next enterprise function in the series of enterprise functions 203 may be a data publishing function 206I, which may be used to publish data. The request handler application 122 (or the rules engine 125) may determine that the data publishing function 206I may be performed by a shared application 128, namely a data publishing application 212F, based on a rule 142. The request handler application 122 may provide data from the client response application 209B to the data publishing application 212F, and wait to receive the output/result (e.g., publishing confirmation) of the data publishing application 212F before moving to the next enterprise function 206J. Since the data publishing application 212F is a shared application 128, the request handler application 122 may route data from multiple different enterprise servers 103 and corresponding client applications 118 to the data publishing application 212F, regardless of the enterprise related function being performed.

The next and last enterprise function in the series of enterprise functions 203 may be a data logging function 206J, which may be used to log data. The request handler application 122 (or the rules engine 125) may determine that the data logging function 206J may be performed by a shared application 128, namely a data logging application 212G, based on a rule 142. The request handler application 122 may provide data from the data publishing application 212F to the data logging application 212G, and wait to receive the output/result (e.g., logging confirmation) of the data logging application 212G. Since the data logging application 212G is a shared application 128, the request handler application 122 may route data from multiple different enterprise servers 103 and corresponding client applications 118 to the data logging application 212G, regardless of the enterprise related function being performed.

Turning now to FIG. 3, a method 300 performed by the communication system 100 is described. In an embodiment, method 300 may be a method for implementing an enterprise agnostic workflow for performing an enterprise related service. Method 300 may be performed after a client application 118 generates a request to perform the enterprise related service or an enterprise function and forwards to the request to a request handler application 122 in the communication system 100.

At step 303, method 300 comprises receiving, by the request handler application 122, from the client application 118 of an enterprise server 103, a request to perform a series of enterprise functions 206 for an enterprise related service. In an embodiment, the series of enterprise functions 206 comprises a security function 206A and a data generation function 206D. In an embodiment, the request comprises client authentication data and input data.

At step 306, method 300 comprises determining, by a rules engine 125 coupled to the request handler application 122, based on a first rule 142, a client authentication and authorization application 212A to perform the security function 206A. The first rule may indicate that the security function 206A is capable of being performed by a shared application 128 that is shared across a plurality of different enterprise servers 103. The client authentication and authorization application 212A is the shared application 128.

At step 309, method 300 comprises providing, by the request handler application 122 to the client authentication and authorization application 212A, the client authentication data to authenticate the client application 118 in the enterprise server 103. At step 312, method 300 comprises determining, by the rules engine based on a second rule 142, a data generation application 209A to perform the data generation function 206D. The second rule 142 may indicate that the data generation function 206D is to be performed by at least one of an enterprise-specific application 131 or a 3P partner application 145 that is not shared across the different enterprise servers 103. The data generation application 209A is at least one of the enterprise-specific application 131 or the 3P partner application 145. At step 315, method 300 comprises providing, by the request handler application 122, the input data to the at least one of the enterprise-specific application 131 or the 3P partner application to perform the data generation function 206D on the input data.

In some embodiments, method 300 may further comprise other features and steps not shown in FIG. 3. In an embodiment, method 300 may further comprise receiving, by the request handler application 122, from a second client application 118 in a second enterprise server 103, a second request to perform a second series of enterprise functions, wherein the second series of enterprise functions comprises the security function 206A and a second data generation function 206D, wherein the second request may comprise second client authentication data and second input data, determining, by the rules engine 125 based on a third rule 142, the client authentication and authorization application 212A to perform the security function 206A for the second client application 118, wherein the third rule 142 indicates that the security function 206A is capable of being performed by the shared application 128 that is shared across a plurality of different enterprise servers 103, and providing, by the request handler application 122 to the client authentication and authorization application 212A, the second client authentication data to authenticate the second client application 118A in the second enterprise server 103. In an embodiment, method 300 may further comprise storing, in a rule data store 115 in the communication system 100, a plurality of rules 142 by which the rules engine 125 is configured to determine an application to perform an enterprise function in the series of functions, wherein the application is at least one of the shared applications 128, the enterprise-specific application 131, or the 3P partner application 145. In an embodiment, method 300 may further comprise at least one of updating a first rule 142 of the rules 142 stored in the rule data store 115 based on a first operator input received by the rules engine 125, adding a new rule 142 to the rule data store 115 based on a second operator input received by the rules engine 125, and deleting an existing rule 142 from the rules 142 stored in the rule data store 115 based on a third operator input received by the rules engine 125. In an embodiment, the request handler application 122 is communicatively coupled to a plurality of different shared applications 128, wherein the different shared applications 128 comprise at least one of the client authentication and authorization application 212A, a data validation application 212B, a data orchestration application 212C, a data storage application 212E, a data publishing application 212F, or a logging application 212G. In an embodiment, the request comprises an identifier of the enterprise related service, and the method 300 may further comprise obtaining, by the request handler application 122, data associated with the enterprise related service, and providing, by the request handler application 122, the data associated with the enterprise related service to one of a plurality of different shared applications 128 to perform an enterprise function. In an embodiment, the shared application 128 is performed based on one or more rules 142 accessible by the rules engine 125, wherein the enterprise-specific application 131 is performed based on hard-coded programmed logic that is specific to an enterprise, and wherein the 3P partner application 145 is performed at a separate server 109 external to the enterprise server 103 and the request handler application 122.

Turning now to FIG. 4, a method 400 is described. In an embodiment, method 400 may be a method for implementing an enterprise agnostic workflow for performing an enterprise related service. Method 400 may be performed after a client application 118 generates a request to perform the enterprise related service or an enterprise function and forwards the request to a request handler application 122 in the communication system 100.

At step 403, method 400 comprises storing, in a rule data store 115 in a communication system 100, a plurality of rules 142 by which a rules engine 125 is configured to determine an application to perform an enterprise function for the enterprise related service. In an embodiment, the application is at least one of a shared application 128, an enterprise-specific application 131, or a 3P partner application 145.

At step 406, method 400 comprises determining, by a rules engine 125 in the communications system 100, based on a rule 142 stored in the rule data store 115, the shared application 128 to perform a first enterprise function indicated in a first request received from a first client application 118 of a first enterprise server 103. The first rule 142 may indicate that first enterprise function is capable of being performed by the shared application 128 that is shared across a plurality of different enterprise servers 103.

At step 409, method 400 comprises receiving, by the rules engine 125 in the communication system 100, an update to the first rule 142 stored in the rule data store 115 based on an operator input received by the rules engine 125. At step 412, method 400 comprises updating, by the rules engine 125, the rule 142 based on the received update. At step 415, method 400 comprises determining, based on the rule 142 stored in the rule data store 115, the shared application 128 to perform a second enterprise function in a second series of enterprise functions indicated in a second request received from a second client application 118 of a second enterprise server 103. The second rule 142 indicates that second enterprise function is also capable of being performed by the shared application 128 that is shared across the different enterprise servers 103.

In some embodiments, method 400 may further comprise other features and steps not shown in FIG. 4. In an embodiment, the first request may comprise data related to at least one of the first client application 118, the first enterprise server 103, or the first series of functions, and the method 400 may further comprise providing, by a request handler application 122 coupled to the rules engine 125, the data to the shared application 128 as input. In an embodiment, the second request comprises data related to at least one of the second client application 118, the second enterprise server 103, or the second series of functions, and the method 400 may further comprise providing, by a request handler application 122 coupled to the rules engine 125, the data to the shared application 128 as input. In an embodiment, updating, by the rules engine 125, the rule 142 comprises adding, deleting, or revising data or logic related to the shared application 128. In an embodiment, method 400 may further comprise determining, based on a third rule 142 stored in the rule data store 115, the enterprise-specific application 131 to perform a third enterprise function in the second series of enterprise functions indicated in the second request, in which the third rule 142 indicates that the third enterprise function is to be performed by the enterprise-specific application 131 comprising hard-coded programmed logic that is specific to an enterprise. In an embodiment, method 400 may further comprise determining, based on a third rule 142 stored in the data store, the 3P partner application 145 to perform a third enterprise function in the second series of functions indicated in the second request, in which the third rule 142 indicates that the third enterprise function is to be performed by the 3P partner application 145 performed at a separate server 109 external to the second enterprise server 103 and the request handler application 122.

Figure 5:
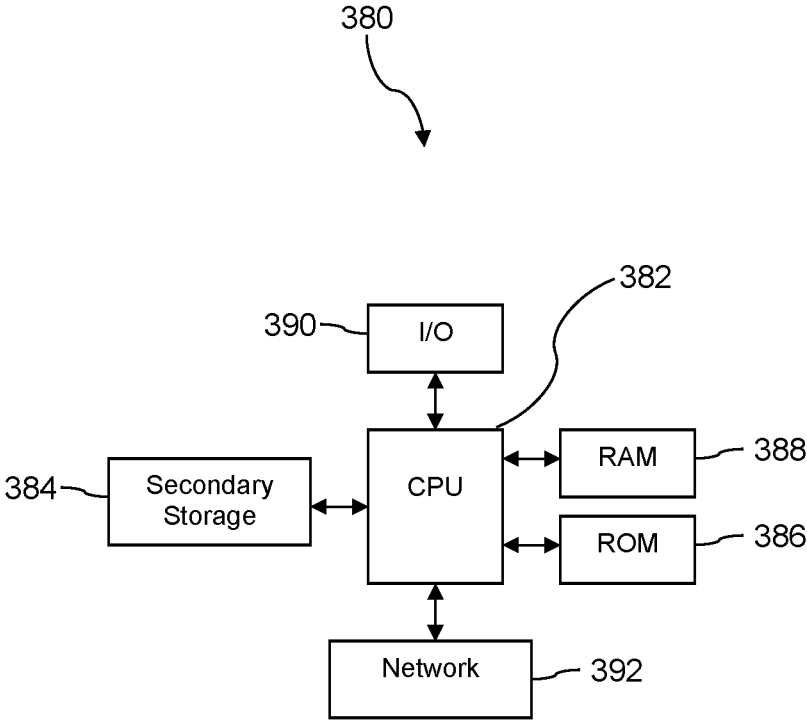
FIG. 5 is a block diagram of a computer system according to an embodiment of the disclosure.

FIG. 5 illustrates a computer system 380 suitable for implementing one or more embodiments disclosed herein. The computer system 380 may be implemented as the enterprise server 103 or the application server 106. The computer system 380 may also be implemented as the request handler application 122 and/or the rules engine 125. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for implementing a workflow for performing an enterprise related service, comprising:

receiving, by a request handler application in a communication system, from a client application of an enterprise server, a request to perform a series of functions for the enterprise related service, wherein the series of functions comprises a security function and a data generation function, and wherein the request comprises client authentication data and input data;

determining, by a rules engine coupled to the request handler application, based on a first rule, a client authentication and authorization application to perform the security function, wherein the first rule indicates that the security function is capable of being performed by a shared application that is shared across a plurality of different enterprise servers, and wherein the client authentication and authorization application is the shared application;

providing, by the request handler application to the client authentication and authorization application, the client authentication data to authenticate the client application in the enterprise server;

determining, by the rules engine based on a second rule, a data generation application to perform the data generation function, wherein the second rule indicates that the data generation function is to be performed by at least one of an enterprise-specific application or a third-party partner application that is not shared across the different enterprise servers, and wherein the data generation application is at least one of the enterprise-specific application or the third-party partner application; and providing, by the request handler application, the input data to the at least one of the enterprise-specific application or the third-party partner application to perform the data generation function on the input data, wherein the at least one of the enterprise-specific application or the third-party partner application performs the data generation function on the input data.

2. The method of claim 1, further comprising:

receiving, by the request handler application, from a second client application in a second enterprise server, a second request to perform a second series of enterprise functions, wherein the second series of enterprise functions comprises the security function and a second data generation function, and wherein the second request comprises second client authentication data and second input data;

determining, by the rules engine based on a third rule, the client authentication and authorization application to perform the security function for the second client application, wherein the third rule indicates that the authentication and authorization function is capable of being performed by the shared application that is shared across a plurality of different enterprise servers; and providing, by the request handler application to the client authentication and authorization application, the second client authentication data to authenticate the second client application in the second enterprise server.

3. The method of claim 1, further comprising storing, in a data store in the communication system, a plurality of rules by which the rules engine is configured to determine an application to perform an enterprise function in the series of functions, wherein the application is at least one of the shared applications, the enterprise-specific application, or the third-party partner application.

4. The method of claim 3, further comprising at least one:

updating a first rule of the rules stored in the data store based on a first operator input received by the rules engine;

adding a new rule to the data store based on a second operator input received by the rules engine; or deleting an existing rule from the rules stored in the data store based on a third operator input received by the rules engine.

5. The method of claim 1, wherein the request handler application is communicatively coupled to a plurality of different shared applications, wherein the different shared applications comprise at least one of the client authentication and authorization application, a data validation application, a data orchestration application, a data storage application, a data publishing application, or a logging application.

6. The method of claim 1, wherein the request comprises an identifier of the enterprise related service, and wherein the method further comprises:

obtaining, by the request handler application, data associated with the enterprise related service; and providing, by the request handler application, the data associated with the enterprise related service to one of a plurality of different shared applications to perform an enterprise function.

7. The method of claim 1, wherein the shared application is performed based on one or more rules accessible by the rules engine, wherein the enterprise-specific application is performed based on hard-coded programmed logic that is specific to an enterprise, and wherein the third-party partner application is performed at a separate server external to the enterprise server and the request handler application.

8. A communication system, comprising:

a processor;

a non-transitory memory;

a request handler application, stored in the non-transitory memory, which when executed by the processor, causes the processor to be configured to receive, from a client application in an enterprise server, a request to perform a series of functions for an enterprise related service;

a rules engine, stored in the non-transitory memory, which when executed by the processor, causes the processor to be configured to:

identify, based on a first rule, whether a first function in the series of functions is capable of being performed by a shared application that is shared across a plurality of different enterprise client applications, wherein the first rule indicates that the first function is capable of being performed by the shared application based on at least one of data describing the client application, data describing the enterprise server, data describing the enterprise related service, or the first function; and identify, based on a second rule, whether a second function in the series of functions is to be performed by at least one of an enterprise-specific application or a third-party partner application, both of which are not shared across the different enterprise client applications, wherein the second rule indicates that the second function is to be performed by the at least one of the enterprise-specific application or the third-party partner application based on at least one of the data describing the client application, the data describing the enterprise server, the data describing the enterprise related service, or the second function; and wherein the request handler application is further configured to instruct the shared application to perform the first function and instruct the at least one of the enterprise-specific application or the third-party partner application to perform the second function, wherein the at least one of the enterprise-specific application or the third-party partner application performs the second function.

9. The communication system of claim 8, wherein the shared application is instructed to perform the first function based on at least one of data received in the request, data obtained from a prior function in the series of functions, data obtained from one or more data stores accessible in the communication system, or the first rule.

10. The communication system of claim 8, wherein the at least one of the enterprise-specific application or the third-party partner application is instructed to perform the second function based on at least one of the data received in the request, data obtained from a prior function in the series of functions, data obtained from one or more data stores accessible in the communication system, or the second rule.

11. The communication system of claim 8, wherein the shared application is performed based on one or more rules accessible by the rules engine, wherein the enterprise-specific application is performed based on hard-coded programmed logic that is specific to an enterprise, and wherein the third-party partner application is performed at a separate server external to the enterprise server and the request handler application.

12. The communication system of claim 8, further comprising one or more memories configured to store a plurality of rules by which the rules engine is configured to determine an application to perform a function in the series of functions, wherein the application is at least one of the shared applications, the enterprise-specific application, or the third-party partner application.

13. The communication system of claim 12, wherein a record associated with each rule is stored at the non-transitory memory, wherein the record comprises at least one of an identifier of the enterprise related service, the data describing the client application, the data describing the enterprise server, the data describing the enterprise related service, an indication of whether a function is capable of being performed by the shared application or is to be performed by the at least one of the enterprise-specific application or the third-party partner application.

14. The communication system of claim 8, wherein the non-transitory memory is further configured to store data associated with the enterprise related service, and wherein the request handler application is further configured to provide the data associated with the enterprise related service as input to the shared application.

15. A method for implementing an enterprise agnostic workflow for performing an enterprise related service, comprising:

storing, in a data store in a communication system, a plurality of rules by which a rules engine is configured to determine an application to perform an enterprise function for the enterprise related service, wherein the application is at least one of a shared application, an enterprise-specific application, or a third-party partner application;

determining, by a rules engine in the communications system, based on a first rule stored in the data store, the shared application to perform a first enterprise function indicated in a first request received from a first client application of a first enterprise server, wherein the first rule indicates that first enterprise function is capable of being performed by the shared application that is shared across a plurality of different enterprise servers;

receiving, by the rules engine in the communication system, an update to the first rule stored in the data store based on an operator input received by the rules engine;

updating, by the rules engine, the first rule based on the update;

determining, by the rules engine in the communications system, based on a second rule stored in the data store, the shared application to perform a second enterprise function indicated in a second request received from a second client application of a second enterprise server, wherein the second rule indicates that second enterprise function is also capable of being performed by the shared application that is shared across the different enterprise servers;

instructing the shared application to perform the first function; and instructing the at least one of the enterprise-specific application or the third-party partner application to perform the second function, wherein the at least one of the enterprise-specific application or the third-party partner application performs the second function.

16. The method of claim 15, wherein the first request comprises data related to at least one of the first client application, the first enterprise server, or a first series of functions including the first enterprise function, and wherein the method further comprises providing, by a request handler application coupled to the rules engine, the data to the shared application as input.

17. The method of claim 15, wherein the second request comprises data related to at least one of the second client application, the second enterprise server, or a second series of functions including the second enterprise function, and wherein the method further comprises providing, by a request handler application coupled to the rules engine, the data to the shared application as input.

18. The method of claim 15, wherein updating, by the rules engine, the first rule comprises adding, deleting, or revising data or logic related to the shared application.

19. The method of claim 15, further comprising determining, based on a third rule stored in the data store, the enterprise-specific application to perform a third enterprise function indicated in the second request, wherein the third rule indicates that the third enterprise function is to be performed by an enterprise-specific application comprising hard-coded programmed logic that is specific to an enterprise.

20. The method of claim 15, further comprising determining, based on a third rule stored in the data store, the third-party partner application to perform a third enterprise function indicated in the second request, wherein the third rule indicates that the third enterprise function is to be performed by the third-party partner application performed at a separate server external to the second enterprise server.

* * * * *